US008621859B2

(12) United States Patent
Grethel

(10) Patent No.: US 8,621,859 B2
(45) Date of Patent: Jan. 7, 2014

(54) HYDRAULIC SYSTEM

(75) Inventor: Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 828 days.

(21) Appl. No.: 12/803,780

(22) Filed: Jul. 6, 2010

(65) Prior Publication Data

US 2011/0005214 A1 Jan. 13, 2011

(30) Foreign Application Priority Data

Jul. 6, 2009 (DE) ......................... 10 2009 031 792

(51) Int. Cl.
*F16D 31/02* (2006.01)

(52) U.S. Cl.
USPC .................................. 60/419; 60/413; 60/428

(58) Field of Classification Search
USPC ............................ 60/413, 419, 435, 437, 428
See application file for complete search history.

(56) References Cited

U.S. PATENT DOCUMENTS 4,215,545 A * 8/1980 Morello et al. ................. 60/437
2007/0107421 A1* 5/2007 Emmert et al. ................. 60/435

* cited by examiner

*Primary Examiner* — Michael Leslie
(74) *Attorney, Agent, or Firm* — Alfred J. Mangels

(57) ABSTRACT

A hydraulic system for actuating a motor vehicle transmission by a control hydraulic power source that includes a control hydraulic pump for providing a high hydraulic pressure, a control pressure accumulator, and a low-pressure hydraulic pump for providing low-pressure volumetric flow of hydraulic fluid for operating a low-pressure hydraulic component. The low-pressure pump is operatively drivingly connected with the control hydraulic pump that is connected in a charged manner with the control pressure accumulator and with a transmission actuator.

20 Claims, 2 Drawing Sheets

HYDRAULIC SYSTEM

BACKGROUND OF THE INVENTION

The present invention relates to a hydraulic system for actuating a transmission with a control hydraulics power source that includes a control hydraulic pump, a control pressure accumulator, and a low-pressure pump that provides low-pressure volumetric flow for a low-pressure hydraulic component.

It is an object of the present invention to optimize a hydraulic system with regard to the design space, weight, costs, and energy efficiency.

SUMMARY OF THE INVENTION

The object of the present invention is achieved by a hydraulic system for actuating a transmission with a control hydraulics power source that includes a control hydraulic pump, a control pressure accumulator, and a low-pressure pump that provides low-pressure volumetric flow for a low-pressure hydraulic component. The low-pressure pump can be connected with the control hydraulic pump in a driving manner, and the control hydraulic pump is connected in a charging manner with the control pressure accumulator. Connection in a driving manner means that the low-pressure pump is utilized to drive the control hydraulic pump. The connection in a driving manner can be carried out mechanically or hydraulically, for example. The control hydraulic pump is connected in a driven manner with the low-pressure pump only occasionally, in order to charge the control pressure accumulator, preferably depending upon demand. The connection in a charging manner means that the control pressure accumulator is charged by the control hydraulic pump.

The low-pressure pump is preferably driven mechanically by an internal combustion engine. The low-pressure volumetric flow preferably involves a cooling oil flow, particularly to supply a wet running clutch with cooling oil. The utilization of the low-pressure pump to drive the control hydraulic pump has the advantage that an electric motor that would otherwise be necessary for driving the control hydraulic pump can be omitted.

A preferred exemplary embodiment of the hydraulic system is characterized in that the control hydraulic pump is connected hydraulically with the low-pressure pump. In accordance with one aspect of the invention, the low-pressure volumetric flow generated for the low-pressure hydraulic component, partially or occasionally is used hydraulically to drive the control hydraulic pump.

A further preferred exemplary embodiment of the hydraulic system is characterized in that the low-pressure pump is hydraulically connected with a hydraulic motor that drives the control hydraulic pump. The hydraulic motor is driven by the low-pressure volumetric flow of the low-pressure pump and is connected in a driving manner with the control hydraulic pump, for example mechanically connected.

A further preferred exemplary embodiment of the hydraulic system is characterized in that an output of the hydraulic motor is or can be connected with the low-pressure hydraulic component. Therefore, the volumetric flow used to drive the control hydraulic pump can be fed to the low-pressure hydraulic component.

A further preferred exemplary embodiment of the hydraulic system is characterized in that the control hydraulic pump is or can be connected mechanically in a driven manner with the low-pressure pump and with an internal combustion engine. The control hydraulic pump can be driven directly via a corresponding mechanical coupling by the internal combustion engine. The control hydraulic pump can also be driven by a similar mechanical coupling via the low-pressure pump.

A further preferred exemplary embodiment of the hydraulic system is characterized in that a clutch is integrated between the control hydraulic pump and the low-pressure pump or the internal combustion engine. Thus, the control hydraulic pump can be driven occasionally, as required, when the clutch is engaged.

A further preferred exemplary embodiment of the hydraulic system is characterized in that the clutch includes an electric actuating device. The electric clutch actuating device can be activated by an engine control, for example, in order to engage the clutch occasionally, as required, so that the control hydraulic pump is driven.

A further preferred exemplary embodiment of the hydraulic system is characterized in that the clutch includes a hydraulic actuating device. The hydraulic clutch actuating device can preferably be connected hydraulically with the low-pressure pump.

The invention further relates to a transmission with a hydraulic system as described above. The transmission can be a stepped automatic transmission or a twin clutch transmission. The transmission is preferably executed as a stepless, adjustable pulley, chain driven transmission.

The invention further relates to a process for actuating the transmission described above, whereby the low-pressure pump is used for driving the control hydraulic pump. In accordance with an essential aspect of the invention, the low-pressure pump is used in order to drive the control hydraulic pump. The low-pressure volumetric flow of the low-pressure pump can be used in order to drive the control hydraulic pump hydraulically. In the process, a change occurs from a high volumetric flow at low-pressure to a low volumetric flow at high pressure. This energy change occurs preferably only briefly in order to charge the pressure accumulator via the control hydraulic pump. Another possibility is to conduct the energy of the low-pressure volumetric flow into a hydraulically switchable clutch by means of a valve. That clutch then briefly connects the control hydraulic pump with an engine of a vehicle in order to charge the pressure accumulator. A further possibility therein includes disposing a switchable clutch between the control hydraulic pump and the engine of the motor vehicle, a clutch that is actuated via any actuator, electrically, for example, in order to charge the pressure accumulator.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
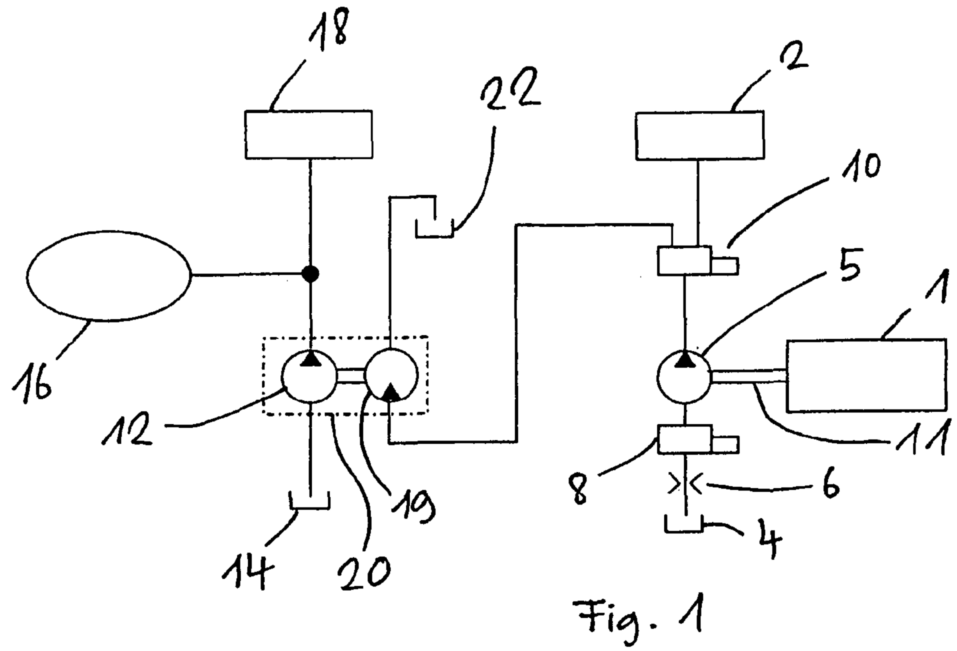
FIG. 1 shows a hydraulic system in accordance with a first exemplary embodiment with a hydraulic motor that is used for driving a control hydraulic pump.

In FIGS. 1 to 4, four different exemplary embodiments of a hydraulic system in accordance with the invention are shown in the form of respective hydraulic circuit diagrams. The hydraulic system includes a vehicle engine 1 that is executed preferably as an internal combustion engine of a motor vehicle.

A low-pressure hydraulic component 2 is supplied with a cooling medium from a tank 4 by means of a low-pressure pump 5. The cooling medium is preferably cooling oil that is withdrawn from the tank 4 through a throttle 6 and a valve 8. The cooling medium that is withdrawn is fed from the low-pressure pump 5 via a further valve 10 to the hydraulic component 2. The hydraulic component 2 can be, for example, a wet running clutch that is connected upstream of a transmission. Low-pressure pump 5 is driven directly by the engine 1 through a mechanical coupling 11.

The hydraulic systems shown in FIGS. 1 to 4 each include a control hydraulic pump 12 in addition to the low-pressure pump 5. Control hydraulic pump 12 draws hydraulic medium from a tank 14 and delivers it to a pressure accumulator 16 and/or to a transmission actuator 18. The hydraulic medium can be hydraulic oil.

The transmission actuator 18 is controlled or actuated hydraulically through the control hydraulic pump 12 or through the pressure accumulator 16. In accordance with an essential aspect of the invention, the control hydraulic pump 12 is driven directly or indirectly by the low-pressure pump 5.

In the embodiment shown in FIG. 1, the low-pressure volumetric flow provided by the low-pressure pump 5 is fed occasionally and as required to a hydraulic motor 19 through the valve 10 in order to drive motor 19 hydraulically. The low-pressure volumetric flow utilized to drive the hydraulic motor 19 is then fed to a tank 22. The tank 22 can be identical with the tank 4. By means of rectangle 20, it is indicated that the hydraulic motor 19 is connected with the control hydraulic pump 12 in order to drive the latter. In the rectangle 20, the relatively large volumetric flow at low-pressure that is provided by the low-pressure pump 5 is transformed into a relatively small volumetric flow at high pressure by means of the hydraulic motor 19 and the control hydraulic pump 12. The energy transformation within the rectangle 20 always occurs only briefly in order to charge the pressure accumulator 16.

Figure 2:
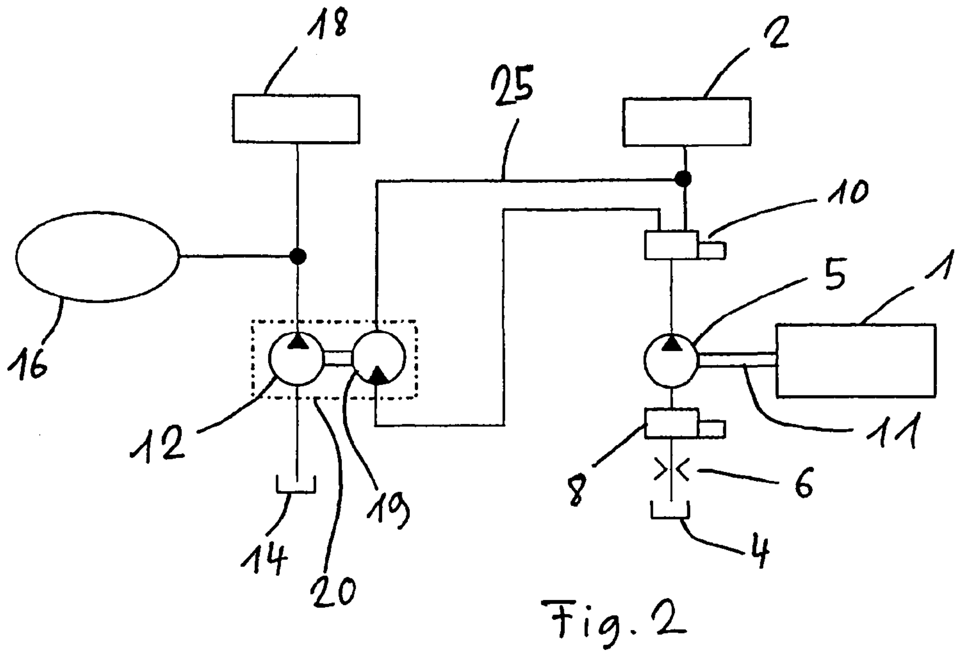
FIG. 2 shows an exemplary embodiment similar to FIG. 1, whereby low-pressure volumetric flow used for driving the hydraulic motor is fed to a low-pressure hydraulic component.

In FIG. 2 there is shown an exemplary hydraulic system embodiment that is generally similar to that shown in FIG. 1, but in which the low-pressure volumetric flow to drive the hydraulic motor 19 is fed to the hydraulic component 2 via recirculation line 25. Otherwise, the exemplary embodiment shown in FIG. 2 corresponds with the exemplary embodiment shown in FIG. 1.

Figure 3:
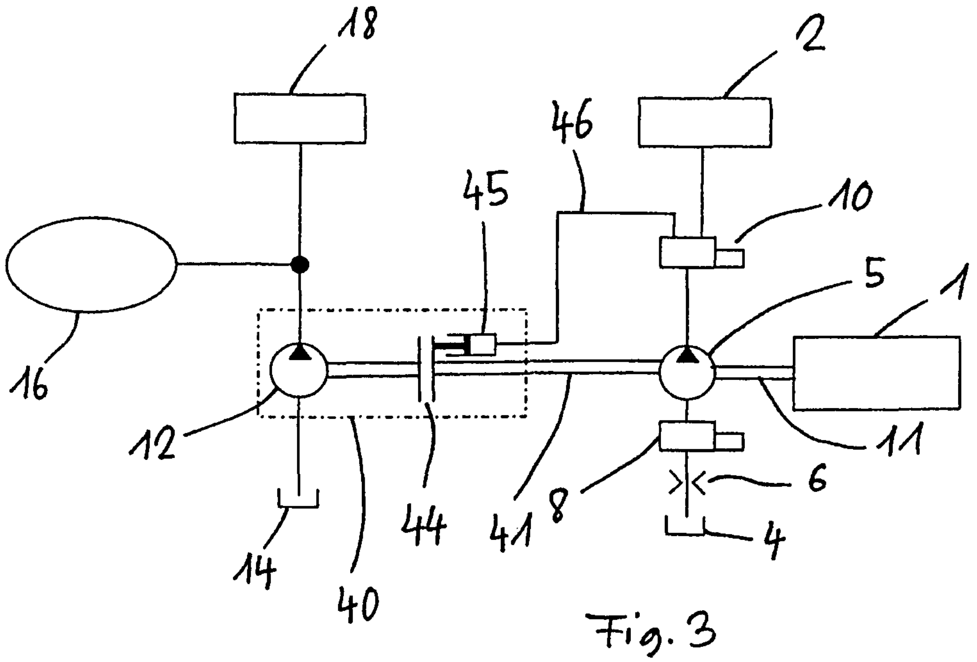
FIG. 3 shows a hydraulic system in accordance with a further exemplary embodiment with a clutch that can be actuated hydraulically between the low-pressure pump and the control hydraulic pump.

In the exemplary embodiment shown in FIG. 3, it is indicated by a rectangle 40 and a mechanical coupling 41 that the control hydraulic pump 12 can be mechanically driven through the mechanical couplings 11 and 41, and the low-pressure pump 5 can be driven by the vehicle engine 1 through the mechanical coupling 11. The vehicle engine 1 can be operatively connected as required via a coupling 44 in order to drive the control hydraulic pump 12.

The coupling 44 can be actuated by a hydraulic actuating device 45 that can be activated via a hydraulic line 46 and the valve 10. Via the valve arrangement 10, the low-pressure volumetric flow provided by the low-pressure pump can be fed entirely or partially to the hydraulic actuating device 45 in order to close the coupling 44 so that the control hydraulic pump 12 is mechanically driven by the vehicle engine 1. In the closed state of the coupling 44, the pressure accumulator 16 is charged from the tank 14 by the control hydraulic pump 12 that is driven by the vehicle engine 1.

Figure 4:
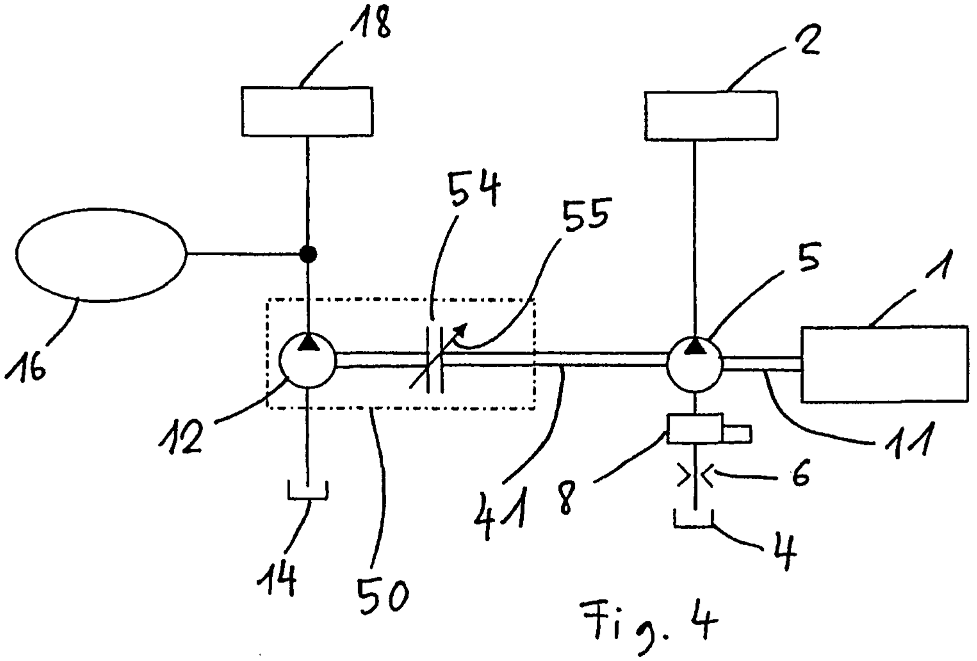
FIG. 4 shows an exemplary embodiment similar to FIG. 3 with a clutch that can be actuated electrically between the low-pressure pump and the control hydraulic pump.

In FIG. 4, a similar exemplary embodiment to that of FIG. 3 is shown, but includes within a rectangle 50 a clutch 54 is that is connected between the mechanical coupling 41 that connects low-pressure pump 5 and control hydraulic pump 12. As indicated by an arrow 55, the clutch 54 can be actuated via an actuator, for example, electrically, in order to charge the pressure accumulator 16. In this exemplary embodiment and in the exemplary embodiment in accordance with FIG. 3, the hydraulic motor 19 can be omitted because the control hydraulic pump 12 can be coupled directly with the vehicle's engine 1 through the clutch 54 and the mechanical coupling 41.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for actuating a transmission, said hydraulic system comprising: a control hydraulics power source that includes a control hydraulic pump and a control pressure accumulator, each of which is operatively connected with a transmission; a low-pressure pump for providing low-pressure volumetric flow for a low-pressure hydraulic component, wherein the low-pressure pump is drivingly connected with the control hydraulic pump; wherein the control hydraulic pump is operatively connected with the control pressure accumulator to charge the accumulator with pressurized hydraulic fluid, wherein the control hydraulic pump is drivingly connected with the low-pressure pump by a hydraulic connection, and wherein the low-pressure pump is connected hydraulically with a hydraulic motor that is drivingly connected with the control hydraulic pump.

2. A hydraulic system in accordance with claim 1, wherein an output of the hydraulic motor is connected with the low-pressure hydraulic component.

3. A transmission with a hydraulic system in accordance with claim 1.

4. A process for actuating a transmission in accordance with claim 3, including the steps of: driving the low-pressure pump by a mechanical connection between the low-pressure pump and the vehicle engine; and driving the control hydraulic pump from power provided from the low-pressure pump to intermittently charge the control pressure accumulator.

5. A hydraulic system for actuating a transmission, said hydraulic system comprising: a control hydraulics power source that includes a control hydraulic pump and a control pressure accumulator, each of which is operatively connected with a transmission; a low-pressure pump for providing low-pressure volumetric flow for a low-pressure hydraulic component, wherein the low-pressure pump is drivingly connected with the control hydraulic pump; and wherein the control hydraulic pump is operatively connected with the control pressure accumulator to charge the accumulator with pressurized hydraulic fluid, wherein the control hydraulic pump is operatively connected with one of the low-pressure pump by a hydraulic connection and an internal combustion engine by a mechanical connection, and including a clutch connected between the control hydraulic pump and the low-pressure pump.

6. A hydraulic system in accordance with claim 5, wherein the clutch is actuated by an electrical actuating device.

7. A hydraulic system in accordance with claim 5, wherein the clutch is hydraulically actuated by a hydraulic actuating device.

8. A hydraulic system in accordance with claim 7, wherein the hydraulic actuating device of the clutch is connected hydraulically with the low-pressure pump.

9. A transmission with a hydraulic system in accordance with claim 5.

10. A process for actuating a transmission in accordance with claim 9, including the steps of:

driving the low-pressure pump by a mechanical connection between the low-pressure pump and the vehicle engine; and driving the control hydraulic pump from power provided from the low-pressure pump to intermittently charge the control pressure accumulator.

11. A hydraulic system for actuating a vehicle transmission, said hydraulic system comprising:

a control hydraulics power source that includes a control hydraulic pump for intermittently charging a control pressure accumulator, each of which is operatively connected with a transmission;

a low-pressure pump for providing low-pressure volumetric flow for a low-pressure hydraulic component, wherein the low-pressure pump is driven by a vehicle engine through a mechanical coupling and is drivingly connected with the control hydraulic pump, wherein the control hydraulic pump is intermittently driven by power provided by the low-pressure pump through one of a separable hydraulic connection between the control hydraulic pump and the low-pressure pump, and a separable mechanical connection between the control hydraulic pump and the low-pressure pump; and wherein the control hydraulic pump is operatively connected with the control pressure accumulator to intermittently charge the accumulator with pressurized hydraulic fluid when power is provided to the control hydraulic pump by the low-pressure pump.

12. A hydraulic system in accordance with claim 11, wherein the low-pressure pump is connected hydraulically with a hydraulic motor that is drivingly connected with the control hydraulic pump.

13. A hydraulic system in accordance with claim 12, wherein an output of the hydraulic motor is connected with the low-pressure hydraulic component.

14. A hydraulic system in accordance with claim 11, wherein the control hydraulic pump is operatively connected with one of the low-pressure pump by a hydraulic connection and an internal combustion engine by a mechanical connection.

15. A hydraulic system in accordance with claim 14, including a clutch connected between the control hydraulic pump and the low-pressure pump.

16. A hydraulic system in accordance with claim 15, wherein the clutch is actuated by an electrical actuating device.

17. A hydraulic system in accordance with claim 15, wherein the clutch is hydraulically actuated by a hydraulic actuating device.

18. A hydraulic system in accordance with claim 17, wherein the hydraulic actuating device of the clutch is connected hydraulically with the low-pressure pump.

19. A transmission with a hydraulic system in accordance with claim 11.

20. A process for actuating a transmission in accordance with claim 19, including the steps of:

driving the low-pressure pump by a mechanical connection between the low-pressure pump and the vehicle engine; and driving the control hydraulic pump from power provided from the low-pressure pump to intermittently charge the control pressure accumulator.

* * * * *